US011170298B2

(12) United States Patent
Truong et al.

(10) Patent No.: US 11,170,298 B2
(45) Date of Patent: Nov. 9, 2021

(54) SYSTEMS AND METHODS FOR SYNTHETIC DATA GENERATION USING A CLASSIFIER

(71) Applicant: Capital One Services, LLC, McLean, VA (US)

(72) Inventors: Anh Truong, Champaign, IL (US); Austin Walters, Savoy, IL (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/686,632

(22) Filed: Nov. 18, 2019

(65) Prior Publication Data

US 2021/0150332 A1   May 20, 2021

(51) Int. Cl.
*G06N 3/08* (2006.01)
*G06N 5/04* (2006.01)
*G06N 3/04* (2006.01)

(52) U.S. Cl.
CPC .............. *G06N 3/08* (2013.01); *G06N 3/0445* (2013.01); *G06N 5/04* (2013.01)

(58) Field of Classification Search
CPC ........... G06N 3/08; G06N 3/0445; G06N 5/04
See application file for complete search history.

(56) References Cited

U.S. PATENT DOCUMENTS

2017/0270919 A1* 9/2017 Parthasarathi .......... G10L 15/02

OTHER PUBLICATIONS

Khassanov, "Unsupervised and Efficient Vocabulary Expansion for Recurrent Neural Network Language Models in ASR", Cornell university, 2018 (Year: 2018).*
Yang, "Reference-Aware Language Models", Cornell university, 2017 (Year: 2017).*
Merrienboer, "Multiscale sequence modeling with a learned dictionary", 2017 (Year: 2017).*
Tam, "RNN-based labeled data generation for spoken language understanding" pp. 125-129, 2015 (Year: 2015).*
Teney, "Graph-Structured Representations for Visual Question Answering", pp. 1-9, 2017 (Year: 2017).*
Maha Elbayad, "Token-level and sequence-level loss smoothing for RNN language models", 2018 (Year: 2018).*
Awasthi, "Parallel Iterative Edit Models for Local Sequence Transduction", 2019 (Year: 2019).*

* cited by examiner

*Primary Examiner* — Ann J Lo
*Assistant Examiner* — Van C Mang
(74) *Attorney, Agent, or Firm* — Finnegan, Henderson, Farabow, Garrett & Dunner LLP

(57) ABSTRACT

The present disclosure provides systems and methods for synthetic data generation. A recurrent neural network can be trained for synthetic data generation by obtaining a sequence of elements and determining, using a classifier, that the sequence corresponds to a token. In response to the determination, a recurrent neural network configured to use a first vocabulary including the elements can be modified to use a second vocabulary, the second vocabulary including the token and the first vocabulary. The modified recurrent neural network can be trained using the token and the sequence of elements. The trained recurrent neural network can be used to generate synthetic data. A classifier can detect sequences of elements in the synthetic data corresponding to tokens. The tokens can replace the sequences of elements in the generated synthetic data and can be provided to the trained recurrent neural network to continue synthetic data generation.

20 Claims, 6 Drawing Sheets

Element Sequence 550

Corresponding Portion 551    $c_1$ = "</p>"

State Sequence 560

Updated Sequence Portion 571

Training Data 570

Initialization State 580

SYSTEMS AND METHODS FOR SYNTHETIC DATA GENERATION USING A CLASSIFIER

TECHNICAL FIELD

The disclosed embodiments generally relate to generation of synthetic data using recurrent neural networks.

BACKGROUND

Machine learning systems can be trained to generate synthetic data with characteristics similar to those of a reference dataset. Such synthetic data can be used when distribution of the reference dataset is restricted (e.g., when the reference dataset contains healthcare records or financial services records) or when large quantities of testing data are required. The synthetic data can be used in place of the reference dataset to train other machine learning models, for application development, and in situations requiring data having characteristics of the reference dataset but not requiring the specific entries in the reference dataset.

Machine learning systems may have difficulty generating highly structured synthetic data, such as log files, markup language documents, or database records. In such data, occasional small mistakes, such as adding a superfluous "s" at the end of an attribute label in a database record or omitting a "/" in a markup tag, can render the synthetic data invalid and unusable or dramatically change its semantics. Accordingly, systems for generating such synthetic data may require additional post-processing or validation to identify or remove syntactically or semantically invalid data. Such post processing can increase the resources and time required to generate such highly structured synthetic data.

SUMMARY

The disclosed systems and methods concern synthetic data generation using a recurrent neural network and a classifier. The recurrent neural network can generate the data and the classifier can automatically identify and correct errors in the generated data. For example, in some embodiments, the classifier can automatically identify an input data schema for the generated data and use the identified input data schema to correct errors in the generated data. By using the classifier to prevent errors, the disclosed embodiments can increase the accuracy of the generated data and reduce the amount of training required to achieve a desired performance level for the system.

The disclosed embodiments include a computer-implemented method of training a recurrent neural network for synthetic data generation. The method can include operations of obtaining a sequence of elements and determining, using a classifier, that the sequence corresponds to a token. The method can further include operations of, in response to the determination, modifying a recurrent neural network (RNN) configured to use a first vocabulary including the elements to use a second vocabulary, the second vocabulary including the token and the first vocabulary.

In some embodiments, the modified RNN can be trained using the token and the sequence of elements. The classifier can include a second recurrent neural network, a logistic regression classifier, a support vector machine, or a decision tree classifier. The elements can include characters or words. The token can represent a string. Determining that the sequence corresponds to the token can include identifying a portion of the sequence matching the string.

In various embodiments, training the modified RNN using the token and the sequence of elements can include creating a training data sequence. The training data sequence can include one or more of the elements immediately preceding a portion of the sequence matching a string represented by the token, the token, and one or more of the elements immediately following the portion of the sequence. The modified RNN can be trained using the training data sequence.

In some embodiments, the computer-implemented method can further include generating a sequence of states corresponding to the sequence of elements using the RNN. Training the modified RNN can include updating the modified RNN using the sequence of states. Updating the modified RNN using the sequence of states can further include reverting the modified RNN to a state corresponding to a first element of a portion of the sequence of states matching a string represented by the token.

In some embodiments, modifying the RNN to use the second vocabulary can include augmenting the RNN with weights corresponding to the token.

The disclosed embodiments further include a system for generating synthetic data. The system can include at least one processor and at least one memory containing instructions. When executed by the at least one processor, the instructions can cause the system to perform operations. The operations can include generating synthetic data including elements and tokens using an RNN. The RNN may have been reconfigured from a first vocabulary including the elements to a second vocabulary including the elements and the tokens. The tokens can represent sequences of the elements. The operations can further include updating the generated synthetic data by replacing the tokens with the elements.

In some embodiments, the operations can further include detecting, in the generated synthetic data, a sequence of elements matching a string represented by one of the tokens. the synthetic data can be updated by replacing the sequence of elements with the one of the tokens.

In various embodiments, in response to detecting the sequence of elements matching the string represented by one of the tokens, the RNN can be reverted to a state corresponding to an initial element in the replaced sequence of elements and the one of the tokens.

In some embodiments, a classifier can detect the sequence of elements matching the string represented by the one of the tokens. The classifier can include a second recurrent neural network, a logistic regression classifier, a support vector machine, or a decision tree classifier. The matching can include soft matching. The elements can include comprise characters or words. The tokens can represent strings.

The disclosed embodiments further include a system including at least one processor and at least one memory. The at least one memory can contain instructions that, when executed by the at least one processor, cause the system to perform operations. The operations can include progressively reconfiguring an RNN from using a first vocabulary including elements to using a second vocabulary including the elements and tokens, the tokens representing sequences of the elements. The RNN can be progressively reconfigured using training data and a classifier trained to identify portions of the training data corresponding to the sequences of the elements. The operations can include generating synthetic data using the progressively reconfigured RNN.

In some embodiments, the classifier can perform a soft match to identify a first portion of the training data as corresponding to a first sequence of the elements. In various embodiments, progressively reconfiguring the RNN can include progressively augmenting the RNN with weights corresponding to ones of the tokens. In some embodiments, progressively reconfiguring the RNN can include progressively adding ones of the tokens to a vocabulary of the RNN as the ones of the tokens are identified in the training data.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures can be rearranged, combined, or divided without departing from the envisioned embodiments. Similarly, additional steps may be added or steps may be removed without departing from the envisioned embodiments. Thus, the materials, methods, and examples are illustrative only and are not intended to be necessarily limiting.

The disclosed embodiments enable generation of more accurate synthetic data by using a recurrent neural network (RNN) to generate the data and a classifier to automatically identify and correct errors in the generated data. In some embodiments, the RNN may be trained using a pre-trained classifier. In various embodiments, the classifier and the RNN may be trained in parallel. In some embodiment the classifier and the recurrent neural may be trained using training examples from the same training data. In various embodiments the RNN may be trained using training examples from the training data, while the classifier is trained using labels associated with the training examples and the output generated by the RNN during training using the training examples. By using the classifier to prevent errors, the disclosed embodiments can also reduce the amount of training (of the RNN or classifier) required to achieve a desired performance level.

Figure 1:
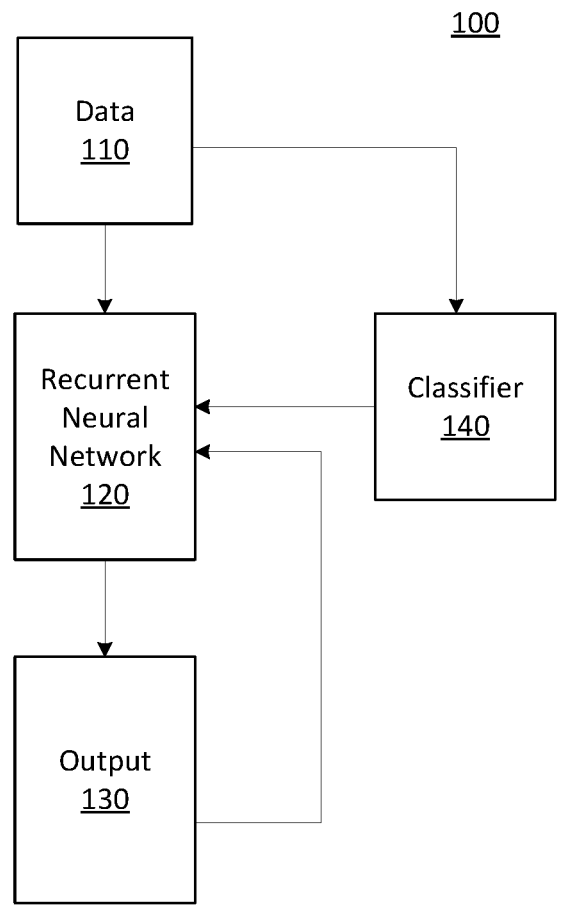
FIG. 1 depicts a schematic of an exemplary system for training a recurrent neural network to generate synthetic data, consistent with disclosed embodiments.

FIG. 1 depicts a schematic of an exemplary system 100 for training a recurrent neural network to generate synthetic data including tokens corresponding to strings, consistent with disclosed embodiments. System 100 can include recurrent neural network 120 (RNN 120) and classifier 140. System 100 can be configured to train RNN 120 to generate synthetic output data using data 110. During training, RNN 120 can generate output 130. Classifier 140 can be configured to detect strings in output 130. Additional training data can be generated by replacing the detected string with a token representing the string. RNN 120 can be trained using the additional training data. In some embodiments, retaining RNN 120 can include reverting RNN 120 to a state prior to generation of the detected string. In this manner, RNN 120 can be trained to generate tokens corresponding to the detected strings.

In some embodiments, data 110 can be training data. The training data can be textual data. For example, the training data can be log files, database records, emails, transcripts of conversation, or the like. In some embodiment, the data can be character-level data (e.g., each element of the data can be, or represent, a character). In various embodiments, the data can be word-level data (e.g., each element of the data can be, or represent, a word). An instance of the word "username" in data 110 could therefore be represented by a sequence of eight characters—"u", "s", "e", "r", "n", "a", "m", "e". Data 110 can be obtained by system 100. For example, data 110 can be, at least in part, generated, received, or retrieved by system 100. As described below with regards to FIG. 6, the format, manner of storage, and manner obtained of data 110 are not intended to be limiting.

In some embodiments, RNN 120 can be a recurrent neural network. RNN 120 can be configured to generate an output and a state using an input and a previously generated state. As would be understood by one of skill in the art, RNN 120 can comprise nodes that generate outputs from weighted combinations of inputs. The nodes can be arranged in layers (e.g., long short-term memory layers), with the outputs of prior nodes becoming the inputs of subsequent nodes. RNN 120 can be configured for synthetic data generation. For example, given a sequence of one or more input elements (e.g., characters), RNN 120 can generate an output element. The sequence of input elements can be updated to include the output element, and a new output element can be generated. In this manner, a sequence of output elements of arbitrary length can be generated.

In some embodiments, RNN 120 can have a vocabulary. The vocabulary can include the elements that RNN 120 is configured to accept as input or predict as output. As a non-limiting example, when RNN 120 is configured to accept and predict ASCII characters, the vocabulary of RNN 120 can be the ASCII characters. Associated with the vocabulary can be a mapping from elements of the vocabulary to values of an input vector for RNN 120. For example, one-hot encoding or embeddings can be used to map elements of the vocabulary to values of the input vector for RNN 120.

In some embodiments, output 130 can be a sequence of states generated by RNN 120. For example, a sequence of elements can be provided to RNN 120. As each element is input to RNN 120, RNN 120 can generate a corresponding output state. Output 130 can include this sequence of output states. In some embodiments, output 130 can be stored in a memory, buffer, file, or the like while operated on by classifier 140. The particular manner of storing output 130 is not intended to be limiting.

In some embodiments, classifier 140 can be a machine learning model configured to identify a sequence of elements in data 110 as matching a string. The sequence of elements can be a sequence of elements used to train RNN 120. For example, the sequence of elements can be provided to RNN 120 to generate output 130. Classifier 140 can be a recurrent neural network, a logistic regression classifier, a support vector machine, a decision tree classifier, or a similar machine learning model. Classifier 140 can be a regular expression or similar string-matching function. In some embodiments, when the elements are characters, the strings can be keywords or phrases. The strings can be predetermined (e.g., classifier 140 can previously have been trained to detect the strings). In some embodiments, the strings can have semantic significance. For example, when the data comprises one or more log files or database records, the string may be a key (e.g., "cs-port", "EventReceivedTime", or the like). As an additional example, when the data comprises one or more documents in a markup language, the string can be a tag (e.g., <blockquote>, </p>, or the like). In various embodiments, when the elements are words, the strings can be sequences of words (e.g., "The", "quick", "brown", "fox", "jumps", "over", "a", "lazy", "dog").

In some embodiments, classifier 140 can be configured to identify the sequence of elements as matching a string when the elements in the sequence are identical in composition and order to the elements in the string. In various embodiments, the matching can be a soft matching. For example, classifier 140 can be configured to identify portions identical in composition but not order (e.g., "<p/>" may be identified as matching "</p>") to the string, or only similar in composition and order (e.g., "usrnam" may be identified as matching "username"). In some embodiments, classifier 140 can be configured to identify the portion as matching based on elements in output 130 before or after the matching portion.

In some embodiments, the classifier can be trained using data 110. Such training can occur before or in parallel with the training of RNN 120. In some embodiments, the training data can be labeled to indicate the existence of strings. For example, when the data includes database records, the data can be associated with labels indicating the attributes present in each record. To continue this example, a database record can include key-value pairs (e.g., "'Username': 'Smith, John'"). The record can be associated with labels (e.g., <username>) indicating the type or position of the keys in the record. As an additional example, when the data includes a markup language document, the document can be associated with labels indicating the type or position of tags in the document. Such labels may be manually created or created programmatical using a parser or another program configured to process the data (e.g., regular expressions or the like can be used to identify attributes or tags in textual data).

The labels can be used for supervised or semi-supervised training of the classifier. For example, as described herein, a training example may be provided to RNN 120 and to classifier 140. The training example can be associated with labels indicating the type or position of strings within the data. The system can train RNN 120 to generate synthetic data having characteristics similar to those of the original dataset, while training classifier 140 to identify the strings in the synthetic data. In some embodiments, classifier 140 may be trained prior to training RNN 120.

In various embodiments, classifier 140 may be trained on the output examples generated by RNN 120, rather than the training examples input to RNN 120. For example, RNN 120 can be trained using training examples obtained from data 110. RNN 120 can generate a sequence of elements during training. Classifier 140 can be trained to recognize strings in the sequence of elements generated by RNN 120 using the labels associated with the training example input to RNN 120. For example, RNN 120 may receive a training example including the string "username". A label may be associated with the training example. The label may indicate the position of the string within the training example. During training, RNN 120 may generate the characters "u" "s" "e" "r" "m" "e" "n" "a" at the positions corresponding to the string "username" in the training example. Classifier 140 may take the output generated by RNN 120 as a training example. The parameters of the classifier may be updated based on whether classifier 140 successfully identified the characters as corresponding to the string "username".

In some embodiments, as described herein, system 100 can be configured to modify RNN 120 in response to identification of a matching portion of the training data. For example, system 100 can revert RNN 120 to an earlier state. The earlier state may have been generated prior to input of the initial element in the matching portion of the training data. In some embodiments, system 100 can resume training using a token corresponding to the string in place of the matched portion of the training data. The token may also be incorporated into the vocabulary of the recurrent neural network. In this manner, RNN 120 can be configured, using classifier 140 and output 130, to generate synthetic data including tokens corresponding to strings, without previously identifying the portions of the training data matching the strings.

Figure 2:
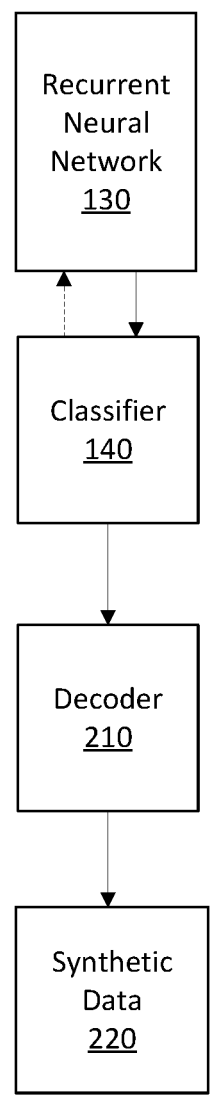
FIG. 2 depicts a schematic of an exemplary system for generating data using a recurrent neural network, consistent with disclosed embodiments.

FIG. 2 depicts a schematic of an exemplary system 200 for generating data using an RNN (e.g., RNN 120), consistent with disclosed embodiments. The RNN can be prompted to generate sequences of elements. A classifier (e.g., classifier 140 or another machine learning classifier) can be configured to receive the sequences of elements output by the RNN. The classifier can be configured to identify a portion of the sequence as matching a string, as described above. System 200 can be configured to update the output, replacing the matched portion with a token. The token can be in the vocabulary of the RNN. The token can represent the matched string.

In some embodiments, in addition to replacing the matched portion with the token, system 200 can discard the elements generated after the matched portion. System 200 can then revert the RNN to a state associated with the matched portion, such as the state of the RNN when the first element of the matched portion was input. For example, with reference to FIG. 5A, when the matched portion includes elements $E_2$ to $E_5$, and the state of the RNN when $E_2$ is input is $S_2$, the system can restart synthetic data generation by reverting the RNN to $S_2$ and inputting matching token $C_1$.

In some embodiments, decoder 210 can be configured to replace tokens representing strings with sequences of elements corresponding to the strings. Decoder 210 can be implemented using a look-up table, key-value list, or similar method of maintaining associations between the tokens and the sequences of elements (or between the tokens, the strings, and the sequences of elements). For example, decoder 210 can include a list of all tokens in the vocabulary of the RNN. Each token in the list can be associated with a string of elements. For example, when the token [c1] represents the string "username", the decoder can be configured to replace each instance of the token [c1] with the string of elements "username".

In some embodiments, synthetic data 220 can be generated by replacing each instance of all tokens in the output of the classifier with corresponding string of elements. The tokens may include tokens generated by RNN 120, or tokens created by classifier 140. For example, the output of the RNN can be "[c1] John, East; usernaem Jay, West". The classifier can identify "usernaem" as matching the token [c1]. In response, system 200 can update the output to "[c1] John, East; [c1] Jay, West". The decoder 210 can replace the tokens with the corresponding strings (e.g., "Username:" in this non-limiting example) to generate "Username: John, East; Username: Jay, West". In various embodiments, synthetic data 220 can be stored or consumed by one or more other system. The manner or storage or method of providing synthetic data 220 to other systems are not intended to be limiting.

Figure 3:
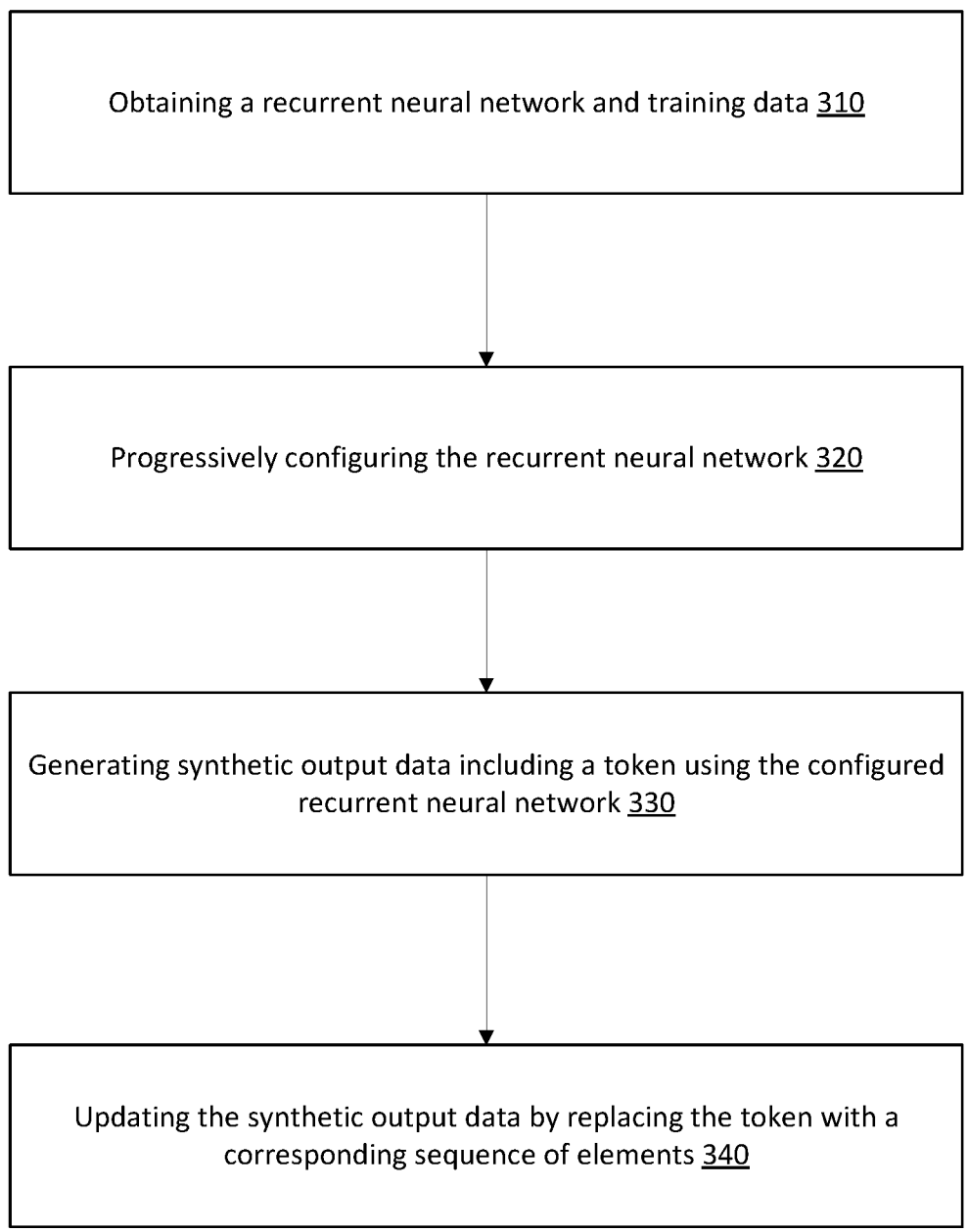
FIG. 3 depicts an exemplary method for generating data using a recurrent neural network, consistent with disclosed embodiments.

FIG. 3 depicts an exemplary method 300 for generating data using a recurrent neural network, consistent with disclosed embodiments. Method 300 can include operations of obtaining a recurrent neural network and training data. Using the training data, the neural network can be progressively configured to incorporate tokens present in the training data. The configured recurrent neural network can then be used to generate synthetic output data. The synthetic output data can be updated by replacing tokens in the synthetic output data with corresponding sequences of elements.

In operation 310 of method 300, a system (e.g., system 100) can obtain a recurrent neural network model. The system can generate the model, receive the model from another system, or retrieve the model from a database, repository, or the like. The model can specify the architecture of the RNN (e.g., the number, type, or arrangement of layers); one or more activation functions associated with one or more layers; values of weights; values of hyper-parameters; or similar characteristics of a machine learning model). In some embodiments, the RNN can be pre-trained. For example, the RNN can be trained to generate synthetic data with similar characteristics to the training data. Such similarity can be defined according a metric selected by a user. In this manner, method 300 can provide an additional refinement to the pre-trained model. In operation 310, the system can also obtain the training data. As described above with regards to FIG. 1, the training data can be textual, and can be word-level or character-level.

In operation 320, the system can be configured to progressively configure the RNN. For example, the system can progressively modify the vocabulary of the RNN to include the strings, as portions matching the strings are identified in the training data. In some embodiments, the first time a portion of the training data is identified as matching a string, the matched string can be added to the vocabulary of the RNN (e.g., by adding to the vocabulary a token corresponding to the matched string). The architecture of the RNN can be updated to accommodate the additional vocabulary item. For example, a one-hot encoding can be expanded to include the additional token. As another example, the token can be associated with an embedding vector. The value of the embedding vector can be initialized to a default value or an arbitrary value. The disclosed embodiments are not limited to a particular way of updating the vocabulary of the RNN.

In various embodiments, when a portion of the training data is identified as matching a string, the RNN can be trained using the token and the sequence of training data elements. For example, a training example can be created using the token corresponding to the portion. In some instances, the matched portion of the training data can be replaced with the token. As detailed below, the state of the RNN can be reverted to a state of the RNN preceding input of the initial element of the matching portion of the training data. Training can then continue, with the token having replaced the matched portion of the training data.

In some embodiments, the system need not progressively configure the RNN. For example, the vocabulary of the RNN may be initially determined based on the elements and the strings present in the training data. For example, when the training data includes database records and the strings include attributes of the records, the RNN may be constructed with a vocabulary including each character in the database records (or potentially in the log files), as well as every attribute in the database records (or potentially in the database records). The particular method used to construct the vocabulary is not intended to be limiting. For example, a database program can be used to generate a list of every attribute in a database. Similarly, when the training data includes log files and the strings include the keywords in the log files, the RNN may be constructed with a vocabulary including each character in the log files (or potentially in the log files), as well as every keyword present in the log files (or potentially in the log files). Again, the particular method used to construct the vocabulary is not intended to be limiting. Likewise, when the training data includes markup language documents and the strings include tags in the markup language documents, the RNN may be constructed with a vocabulary including each character in the documents (or potentially in the documents) and each tags in the documents (or potentially in the documents—for example, each tag supported by the markup language).

In operation 330 of method 300, the system can generate synthetic output data using the configured recurrent neural network. The synthetic output data can include a token representing a string. Because the RNN was trained by replacing portions of the training data with the token, the token may be positioned in the synthetic output data in a location preserving the semantics of the string.

In operation 340 of method 300, the system can update the synthetic output data by replacing the token with a sequence of elements. The sequence of elements can match the string represented by the token. For example, when the token [p1] represents the string "</p>" and the elements are characters, the system can replace the token [p1] with the sequence of characters "<", "/", "p", and ">". As described herein, the system can be configured to maintain associations between tokens and the sequences of elements using a look-up table, key-value list, or a like method.

Figure 4:
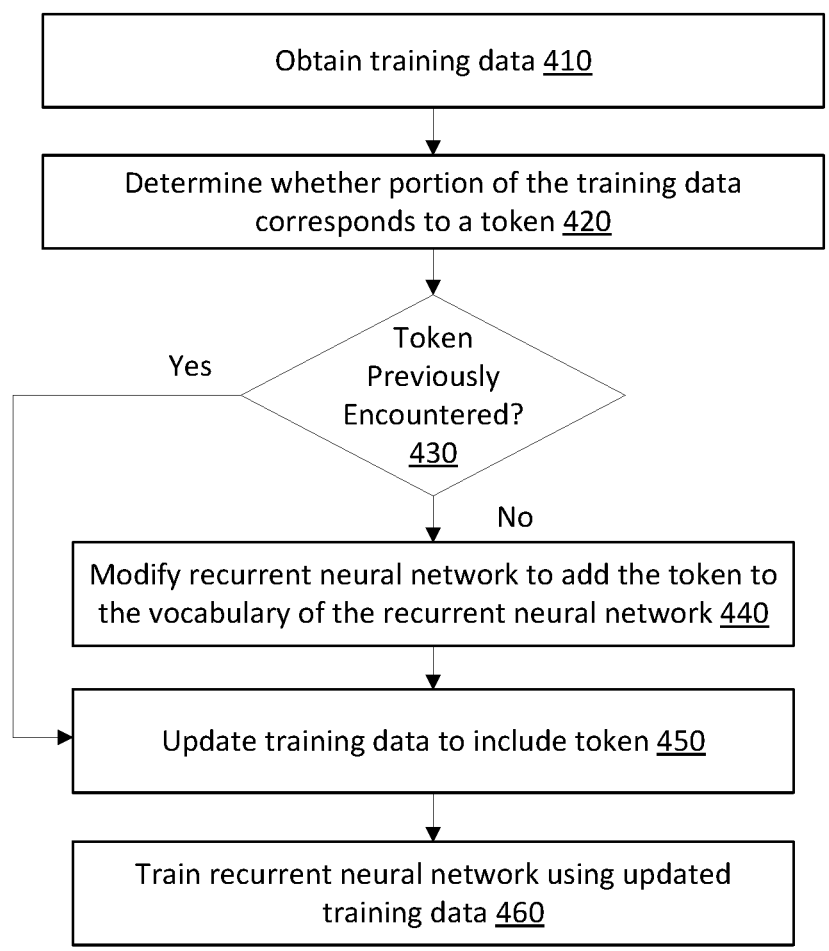
FIG. 4 depicts an exemplary method for training a recurrent neural network to generate synthetic data, consistent with disclosed embodiments.

FIG. 4 depicts an exemplary method 400 for training a recurrent neural network to generate synthetic data, consistent with disclosed embodiments. In some embodiments, method 400 can be performed during operation 320 of method 300. Method 400 can include operations of obtaining training data and determining that a portion of the training data corresponds to a token. When the token has not previously been encountered, a vocabulary of the RNN can be modified to add the token. The training data can be updated to include the token. The training of the RNN can then continue, using the update training data. In this manner, the training data can be scanned for tokens during training and the vocabulary of the RNN updated as tokens are encountered.

In operation 410 of method 400, the system (e.g., system 100) can obtain training data. As described above, the training data can be textual. The system can be configured to generate training examples from the training data. As a non-limiting example, the system can be configured to slide a window of a predetermined length over the training data. The elements within the window can form a training example and the element immediately after the window can form the "ground truth" or label corresponding to the training example. In the next training example, the earliest element in the training data is discarded, the label becomes the last element of the training example, and the next element in the training data becomes the label. Other methods of generating labeled training samples may be used, and the disclosed embodiments are not limited to a particular method.

Figure 5A:
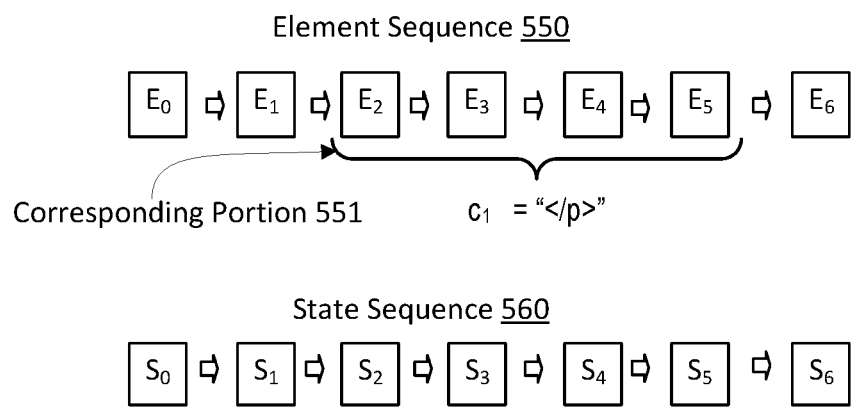
FIGS. 5A and 5B depict exemplary sequences of elements in a training example, sequences of recurrent neural network states, and an updated training example and associated state, consistent with disclosed embodiments.

In operation 420 of method 400, the system can determine whether a portion of the training data corresponds to a token. As shown in FIG. 5A, the training example may include a sequence of elements (element sequence 550). Each element may be applied to the RNN (e.g., RNN 120) sequentially. The current state of the RNN and the input element can be used to generate a new state. The states generated by the RNN can form a sequence (e.g., element sequence 550), which can be output (e.g., as a part of output 130). As depicted in FIG. 5A, element sequence 550 and state sequence 560 are aligned such that element $E_0$ and state $S_0$ are input to the RNN to generate state $S_1$. Element $E_1$ and state $S_1$ are then input to the RNN to generate state $S_2$. In this non-limiting example, elements $E_2$ to $E_5$ match the string "</p>". This string can be associated with the token $C_1$, as shown.

In some embodiments, the determination of whether a portion of the training data corresponds to a token can occur in parallel with training the RNN. For example, while the RNN is calculating a label, a classifier (e.g., classifier 140) may be determining whether a portion of the training data matches a string. As described herein, the classifier may be trained in parallel with the RNN. As many training samples will not include such matching portions, performing classification in parallel with training may be significantly faster than performing classification (and replacement of matching portions) prior to training.

In operation 430 of method 400, the system can determine whether the identified token has previously been encountered during training. In some embodiments, the system can be configured to maintain a list of previously encountered tokens.

In operation 440 of method 400, when the token has not previously been encountered, the system can add the token to a vocabulary of the RNN. In some embodiments, adding the token to the vocabulary of the RNN can include changing an architecture of the RNN. For example, the RNN can be adapted to accommodate the additional token as a potential input and a potential prediction as a next element. In some embodiments, adapting the RNN can include augmenting the RNN with weights corresponding to the token. For example, when the input and output are one-hot encoded, the input and output size can be equal to the number of items in the vocabulary. Increasing the size of the vocabulary to accommodate the new token may therefore require changing the encoding of the input and output. Alternatively, when using an embedding, the embedding value associated with the token can be initialized to a value. This value may be a default or randomly selected value. The RNN can then learn the correct value during training.

In operation 450 of method 400, the system can update the training data in response to the determination in operation 420. In some embodiments, the portion of the training example matching the string can be replaced with the token.

In operation 460 of method 400, the system can train the recurrent neural network using the updated training data. The training can include a forward phase and a backward phase. In the forward phase, each element in the training sequence can be sequentially input into the RNN. The state of the RNN is then updated based on the inputted element and the current state of the RNN. The RNN can generate an output based on the inputted element and the current state of the RNN. The output generated by the RNN in response to inputting the final element in the sequence, using the final state, can be compared to the label to generate an error. In the backward phase of the training, the weights of the RNN can be updated using the error. For example, the weights can be updated using backpropagation-through-time or a similar algorithm.

Figure 5B:
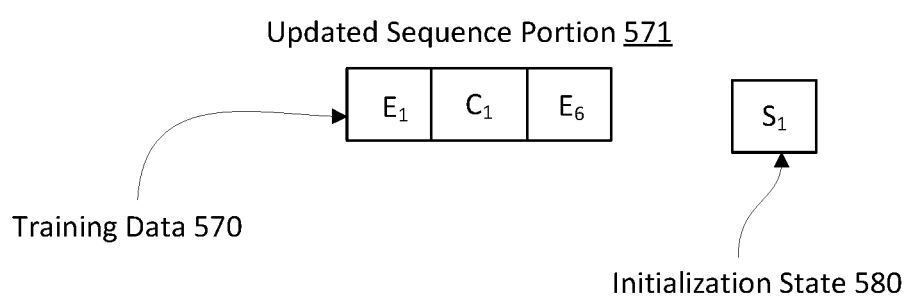

As the classifier, in some embodiments, can identify matching portions of training examples in parallel with the training of the RNN, updating the training data can interrupt the training. The system can interrupt the training to repeat the forward phase using at least a portion of the updated training example (which can include the token in place of the matched portion). In some embodiments, for example, the system can repeat the entire forward phase using the updated training example. In various embodiments, the system can repeat some of the forward phase. For example, as shown in FIG. 5B, the system can repeat training for a portion (e.g., updated sequence portion 571) of element sequence 550. This portion can include the token and the remainder of the updated training example following the token. This portion can also include zero or more elements preceding the token in the updated training example. For example, updated sequence portion 571 in FIG. 5B can include element $E_1$ in addition to token $C_1$ and element $E_6$. When the system repeats training for a portion of element sequence 550, the system can revert the RNN to a prior state. The prior state can be the state the RNN was in when the first element of the updated sequence portion 571 was previously input to the RNN. For example, as shown in FIG. 5B, the RNN can be reverted to $S_1$, which was the current state of the RNN when $E_1$ was previously input, as shown in state sequence 560. When the first element in updated sequence portion 571 is the token $C_1$, the prior state can be the state the RNN was in when the first element of corresponding portion 551 was previously input to the RNN. For example, when element $E_2$ is the first element in corresponding portion 551, the prior state can be state $S_2$. In this manner, the RNN can be reverted to the correct state for replaying the training, but with the token replacing the corresponding portion 551. As would be appreciated by those of skill in the art, element sequence 550 can be include 100 to 1000 elements, or more. Reverting to a prior state, rather than restarting training, can save significant training time. Furthermore, a training example may include multiple portions matching one or more strings. Identification of the matching portions, updating of the training example, and reversion of the RNN to a prior state can happen as the matched portions are identified, without requiring the training to restart each time a match is identified or waiting until the entire training example is scanned for matching strings.

In various embodiments, after a matched portion has been identified in a training example, the corresponding portions of overlapping training examples can also be updated. For example, in the sliding window example given above, when the string "</p>" corresponds to token [p1] and constitutes elements 4 to 7 of a first training example, this string will constitute elements 3 to 6 of the next, second training example, and elements 2 to 5 of the subsequent, third training example. After the portion of the first training example matching the string is identified (elements 4 to 7), the system may update the corresponding portions of the second training example (elements 3 to 6) and the third training example (elements 2 to 5). These additional training examples can be updated before they are used in training. For example, they may be updated when the portion of the first training example is identified. In this manner, additional time may be saved in training the recurrent neural network.

Figure 6:
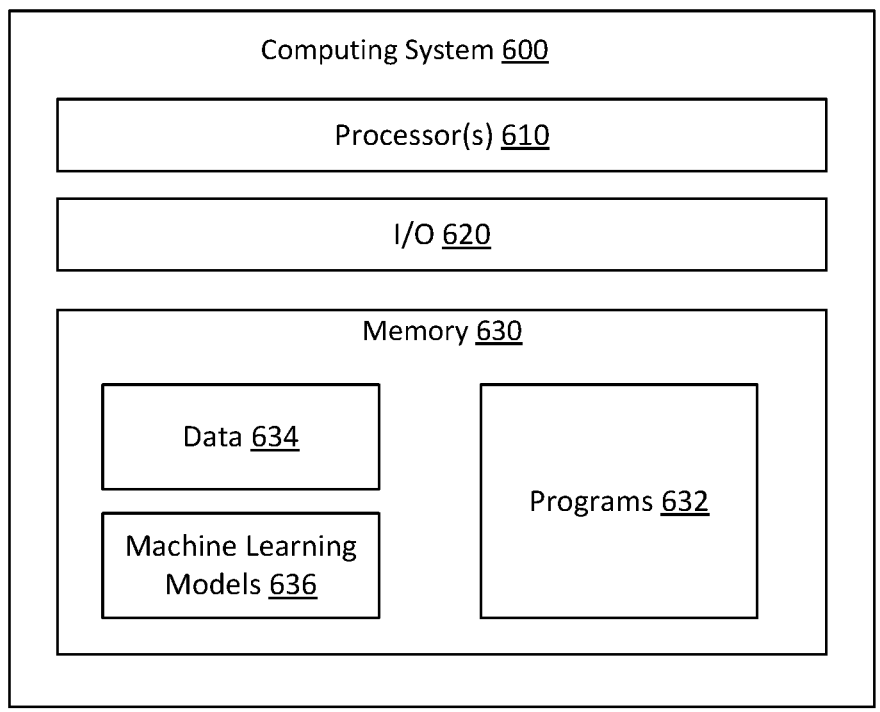
FIG. 6 depicts an exemplary computing system suitable for implementing the disclosed embodiments.

FIG. 6 depicts an exemplary computing system 600 suitable for implementing the disclosed embodiments. Computing system 600 may include a computing device, a computer, a server, a server cluster, a plurality of clusters, or a cloud service, consistent with disclosed embodiments. For example, computing system 600 can include one or more resources hosted on at least one cloud-computing platform that provides the functionality of the components disclosed in FIG. 6. In some embodiments, computing system 600 can be a scalable system configured to efficiently manage resources and enhance security by provisioning computing resources in response to triggering events and terminating resources after completing a task (e.g., a scalable cloud service that spins up and terminates container instances). The components and arrangements shown in FIG. 6 are not intended to limit the disclosed embodiments, as the components used to implement the disclosed embodiments may vary.

Processor(s) 610 can include at least one computing processor (e.g., a central processing unit, graphical processing unit, application specific integrated circuit, or another suitable computing processor). Processor(s) 610 can include a single-core or multiple-core processor. Processor(s) 610 can be configured for parallel processing of data or instructions. Processor 610 can be configured to execute instructions stored in memory 630 to perform the disclosed embodiments.

I/O device 620 can include one or more input devices (e.g., a keyboard, touchscreen, microphone, haptic device, camera, or other suitable devices), one or more output devices (e.g., a display, printer, haptic device, or other suitable devices), or one or more network interface controllers (e.g., an ethernet controller, wireless network controller, or other suitable controller). I/O device 620 may be configured to support interactions between computing system 600 and other computing systems, or between computing system 600 and users.

Memory 630 can be a volatile or non-volatile, magnetic, semiconductor, optical, removable, non-removable, or other type of storage device or tangible (i.e., non-transitory) computer-readable medium, consistent with disclosed embodiments. Memory 630 can be a unified memory or a distributed memory. For example, memory 630 can include a portion of a solid-state drive associated with a physical machine, a storage resource hosted on a cloud computing platform (e.g., an AWS S3 Bucket), or another suitable memory. As shown, programs 632, data 634, or machine learning models 636 can be stored in memory 630.

Programs 632 can include one or more programs (e.g., instructions, code, scripts, or the like) used to perform methods consistent with disclosed embodiments. Programs 236 can include programs written in one or more suitable programming or scripting languages at any level or combination of levels of abstraction (e.g., a low-level programming language such as machine language or assembly, an intermediate representation such as LLVM code, a high-level programming language such as C++, java, or python, or the like). In some embodiments, programs 236 may include functionality implemented or replicated using software, hardware, or a combination of software and hardware. As a non-limiting example, one or more functional components of programs 236 can be implemented using firmware or circuit logic.

Programs 632 can include a machine learning application, development environment, or similar machine learning framework (e.g., XGBOOST, TENSORFLOW, or the like). Such a machine learning framework can enable computing system 600 to obtain machine learning models. For example, using the machine learning framework, a user can interact with computing system 600 to receive, retrieve, and/or generate models, consistent with disclosed embodiments.

The machine learning framework may include programs (scripts, functions, algorithms) to assist creation of, train, implement, store, receive, retrieve, and/or transmit one or more machine learning models. The machine learning framework may be configured to assist creation of, train, implement, store, receive, retrieve, and/or transmit, one or more ensemble models (e.g., models comprised of a plurality of models). In some embodiments, training of a model may terminate when a training criterion is satisfied. Training criteria may include number of epochs, training time, performance metric values (e.g., an estimate of accuracy in reproducing test data), or the like. The machine learning framework may be configured to adjust model parameters and/or hyperparameters during training. For example, the machine learning framework may be configured to modify model parameters and/or hyperparameters (i.e., hyperparameter tuning) using an optimization technique during training, consistent with disclosed embodiments. Hyperparameters may include training hyperparameters, which may affect how training of a model occurs, or architectural hyperparameters, which may affect the structure of a model. Optimization techniques used may include grid searches, random searches, gaussian processes, Bayesian processes, Covariance Matrix Adaptation Evolution Strategy techniques (CMA-ES), derivative-based searches, stochastic hill-climbing, neighborhood searches, adaptive random searches, or the like.

In some embodiments, the machine learning framework may be configured to generate models based on instructions received from another component of computing system 600 and/or another computing system. For example, the machine learning framework can be configured to receive a visual (e.g., graphical) depiction of a machine learning model and parse that graphical depiction into instructions for creating and training a corresponding neural network. The machine learning framework can be configured to select model training parameters. This selection can be based on model performance feedback received from another component of the machine learning framework.

Data 634 can include data obtained by computing system 600 from a user, another computing system, or a resource accessible to computing system 600 (e.g., a database accessible to computing system 600). For example, data 634 can include data obtained using I/O device 620. Data 634 can include data generated in whole or in part by computing system 600, for example using processor(s) 610 and data or instructions stored in memory 630 (e.g. machine learning models 636, programs 632, or the like). Data 634 can include training data or inference data, as discussed herein. The particular data source, manner obtained, and format of data 634 are not intended to be limiting.

Machine learning models 636 can include models generated using programs 632 (e.g., using the machine learning framework). Machine learning models 636 can also include models received from another component of computing system 200 and/or another computing system. For example, computing system 200 can obtain models from another computing system and store the models in memory 630. The models can be untrained, partially trained, or fully trained. The models can include recurrent neural network models suitable for generating synthetic data, such as the models described above with regards to the disclosed embodiments.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples, but instead are defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps.

Furthermore, as used herein the term "or" encompasses all possible combinations, unless specifically stated otherwise or infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C. Similarly, the use of a plural term does not necessarily denote a plurality and the indefinite articles "a" and "an" do not necessary denote a single item, unless specifically stated otherwise or infeasible.

It is intended, therefore, that the specification and examples be considered as example only, with a true scope and spirit being indicated by the following claims and their full scope of equivalents.

What is claimed is:

1. A computer-implemented method of training a recurrent neural network (RNN) for synthetic data generation, comprising:
   obtaining a sequence of elements;
   generating, using a recurrent neural network configured to use a first vocabulary including the elements, a sequence of states corresponding to the sequence of the elements;
   determining, using a classifier trained to identify matches to a token, that a portion of the sequence of elements matches the token; and
   in response to the determination:
      modifying the RNN to use a second vocabulary, the second vocabulary comprising the token identified by the classifier and the first vocabulary; and
      training the modified RNN using the token, the sequence of the elements, and the sequence of the states, the training comprising reverting the modified RNN to a first state of the sequence of the states, the first state corresponding to a first element of the portion.

2. The computer-implemented method of claim 1, wherein the classifier comprises at least one of a second recurrent neural network, a logistic regression classifier, a support vector machine, or a decision tree classifier.

3. The computer-implemented method of claim 1, wherein the elements comprise at least one of characters or words.

4. The computer-implemented method of claim 1, wherein the token represents a string.

5. The computer-implemented method of claim 1, wherein modifying the RNN to use the second vocabulary comprises augmenting the RNN with weights corresponding to the token.

6. A system for generating synthetic data, comprising: at least one processor; and at least one memory containing instructions that, when executed by the at least one processor, cause the system to perform operations comprising: generating synthetic data including elements and tokens using a recurrent neural network (RNN) reconfigured from using a first vocabulary including the elements to using a second vocabulary, wherein: the second vocabulary includes the elements and the tokens, the tokens representing sequences of the elements; and the inclusion of at least one of the tokens in the second vocabulary is based on a classifier matching a portion of training data for the RNN to a first one of the sequences of elements; and correcting errors in the generated synthetic data, the correction comprising: detecting, in the generated synthetic data, an erroneous sequence of the elements that matches a string, the string corresponding to a first one of the tokens; updating the synthetic data by replacing the erroneous sequence of elements with the first token; and updating the generated synthetic data by replacing the first token with a corresponding sequence of elements.

7. The system of claim 6, further comprising:
   in response to detecting the erroneous sequence of the elements:
      reverting the RNN to a state corresponding to an initial element in the replaced erroneous sequence of the elements and the one of the tokens.

8. The system of claim 6, wherein the classifier detects the erroneous sequence of the elements matching the string represented by the one of the tokens.

9. The system of claim 8, wherein the classifier comprises a second at least one of a recurrent neural network, a logistic regression classifier, a support vector machine, or a decision tree classifier.

10. The system of claim 6, wherein the elements comprise at least one of characters or words.

11. The system of claim 6, wherein the tokens represent strings.

12. A system, comprising: at least one processor; and at least one memory containing instructions that, when executed by the at least one processor, causes the system to perform operations comprising: reconfiguring a recurrent neural network (RNN) from using a first vocabulary including elements to using a second vocabulary, the second vocabulary including the elements and tokens, the tokens representing sequences of the elements, using: training data; and a classifier trained to identify portions of the training data that corresponds to the sequences of the elements, inclusion of one of the tokens included in the second vocabulary being based on a match of a first portion of the training data to a first one of the sequences of the elements; and generating second synthetic data, the generation comprising: generating first synthetic data using the reconfigured RNN; and correcting errors in the first synthetic data at least in part by detecting, in the first synthetic data, an erroneous sequence of the elements that matches a string, the string corresponding to one of the tokens.

13. The system of claim 12, wherein:
the classifier determines that the erroneous sequence of the elements matches the string.

14. The system of claim 12, wherein:
reconfiguring the RNN comprises:
augmenting the RNN with weights corresponding to ones of the tokens; or
adding ones of the tokens to a vocabulary of the RNN as the ones of the tokens are identified in the training data.

15. The computer-implemented method of claim 1, wherein:
the token corresponds to one of a keyword, a key in a key-value pair, or a markup language tag.

16. The computer-implemented method of claim 1, wherein:
the classifier is trained in parallel with the training of the RNN for synthetic data generation.

17. The computer-implemented method of claim 1, wherein:
the classifier is trained using the output of the RNN.

18. The computer-implemented method of claim 1, wherein:
the classifier is trained using the same training examples as the RNN.

19. The system of claim 6, wherein:
the one of the tokens corresponds to one of a keyword, a key in a key-value pair, or a markup language tag.

20. The system of claim 12, wherein:
the one of the tokens corresponds to one of a keyword, a key in a key-value pair, or a markup language tag.

* * * * *